(12) United States Patent
Huang

(10) Patent No.: US 6,959,594 B2
(45) Date of Patent: Nov. 1, 2005

(54) EXTERNAL MOUNT TIRE PRESSURE SENSOR SYSTEM

(75) Inventor: Su Shiong Huang, Bellevue, WA (US)

(73) Assignee: Silicon Valley Micro C Corp., San Jose, CA (US)

( * ) Notice: Subject to any disclaimer, the term of this patent is extended or adjusted under 35 U.S.C. 154(b) by 0 days.

(21) Appl. No.: 10/346,490

(22) Filed: Jan. 21, 2003

(65) Prior Publication Data

US 2005/0072224 A1 Apr. 7, 2005

(51) Int. Cl.[7] ............................................. G01M 17/02
(52) U.S. Cl. ...................................... 73/146; 73/146.2
(58) Field of Search ................................ 73/146–146.8; 340/442–447

(56) References Cited

U.S. PATENT DOCUMENTS 3,697,944 A * 10/1972 Murano ....................... 340/447
5,838,229 A * 11/1998 Robinson, III .............. 340/442
6,293,140 B1 * 9/2001 Lohberg ......................... 73/146

* cited by examiner

Primary Examiner—William Oen
Assistant Examiner—Jermaine Jenkins

(57) ABSTRACT

An external mount tire pressure sensor system with a stretch sensor having a variable resistance longitudinal displacement characteristic. The stretch sensor is coupled to a processor which samples the resistance of the stretch sensor periodically. The sensor body is attached to the external side wall of a pneumatic tire so that the body is displaced by the tire side wall and the resistance is a function of internal tire pressure. When the processor determines that the pressure is below a threshold value, an r.f. generator is activated by the processor to generate a low tire pressure signal. This signal is converted by a receiver to a warning for the driver.

10 Claims, 5 Drawing Sheets

EXTERNAL MOUNT TIRE PRESSURE SENSOR SYSTEM

BACKGROUND OF THE INVENTION

This invention relates to automotive tire pressure sensors. More particularly, this invention relates to a method and system for monitoring internal tire pressure of vehicles using an externally mounted sensor.

Tire pressure sensor systems are known and are commonly used to monitor the internal air pressure in individual pneumatic tires of a vehicle and to provide a warning signal to the driver whenever the internal air pressure in one or more of the vehicle tires is dangerously low or high. The warning signal is typically generated by an r.f. signal generator controlled by a microprocessor connected to the tire pressure sensor whenever the internal tire pressure measured by the sensor lies outside a predetermined normal operating range. This r.f. signal is transmitted to a vehicle-mounted receiver, which uses the warning signal to alert the driver either visually (by activating a warning lamp or display) or audibly (by activating an audible alarm) or both.

Known tire pressure systems typically employ one of two basic design configurations. The first type of design configuration employs an internal arrangement in which all components comprising the signal transmitting portions of the tire pressure sensor system are positioned within the tire casing. In a typical installation of this type, the pressure sensor, r.f. generator, the microprocessor, and the D.C. battery power source are physically installed inside the pneumatic tire casing prior to inflation of the tire, usually by attaching these components to an inner surface of the wheel. Design configurations of this first type suffer from several disadvantages. Firstly, the installation of the system components within the tire casing is not simple, requires careful attention to the component location and mounting, and increases the manufacturing cost of the entire automobile. In addition, many vehicles use steel-belted tires, which interact in a detrimental manner with the r.f. signals generated internally of the tire. Further, when the battery or one of the other system components fails, replacement of the defective component requires that the affected tire be removed from the wheel before replacement can be done, which is costly and time consuming.

The second type of basic design configuration used for current tire pressure sensor systems employs components which are mounted in a cap which is threadably attached to the exposed outer end of the valve stem of the tire. While this design arrangement avoids the disadvantages noted above associated with internally mounted tire pressure monitoring systems, it introduces the following additional disadvantages. Firstly, because the pressure monitoring system is carried by the externally-protruding valve stem, the acceleration force produced by the rotating wheel and tire, which can reach a magnitude of 200 g., can severely impair the accuracy of the sensor system. In addition, the system components can easily be inadvertently lost or stolen.

Efforts to provide a simple yet accurate and durable tire pressure monitoring system devoid of the above-noted disadvantages have not been successful to date.

SUMMARY OF THE INVENTION

The invention comprises a method and system for monitoring internal vehicle tire pressure employing externally-mounted components which are relatively simple and inexpensive to manufacture and install on a vehicle, which provide accurate internal tire pressure readings, which can easily and inexpensively be replaced in case of failure, and which are devoid of the disadvantages noted above in known systems.

In a broadest aspect, the invention comprises an external mount tire pressure sensor system having a variable resistance displacement sensor element for providing resistance values indicative of internal tire pressure when coupled to an external wall surface of a pneumatic tire. The variable resistance displacement sensor element has a variable resistance characteristic which is essentially linear with longitudinal displacement. A processor is coupled to the displacement sensor element and converts resistance values corresponding to inadequate internal tire pressure to r.f. generator activation signals. The r.f. generator activation signals are coupled to an r.f. generator circuit which transmitts a low tire pressure warning signal when activated by the processor. The variable resistance displacement sensor, the processor, and the r.f. generator circuit are all preferably mounted on a flexible substrate so that a complete unit can be easily attached to the external side wall of the tire.

The invention further includes a D.C power source such as a battery for supplying electrical power to the variable resistance displacement sensor, the processor, and the r.f. generator circuit.

In the preferred embodiment, the processor further includes value determining circuitry for determining the maximum and minimum resistance values provided by the variable resistance displacement sensor during one revolution of a pneumatic tire and for calculating the difference between the maximum and the minimum resistance values. Comparison circuitry in the processor compares the difference with a predetermined threshold value. When the difference is greater than the predetermined threshold value, the processor activates the r.f. generator.

The processor further includes control circuitry for controlling the operation of the value determining circuitry and the comparison circuitry in accordance with the magnitude of the difference. The control circuitry delays the operation of the value determining circuitry and the comparison circuitry for a first time period, for example one minute, when the magnitude of the difference does not exceed the threshold, and delays the operation of the value determining circuitry and the comparison circuitry for a second shorter time period, for example ten seconds, when the magnitude of the difference exceeds the threshold.

The invention further includes receiver circuitry for converting the low tire pressure warning signal to a warning indicator signal to operate a visible or audible driver alarm.

The invention provides a convenient solution to the problem of monitoring internal tire pressure in vehicles equipped with pneumatic tires. The system can be installed either during manufacture of a new vehicle or as an after market item. The invention avoids the necessity of de-mounting the tire from the wheel to install or to replace an exhausted component, which is especially useful when replacing the D.C. battery power source. Further, existing vehicles without tire pressure sensor systems can easily be retrofitted with a state-of-the-art system at relatively low cost. This is particularly beneficial in jurisdictions which mandate low tire pressure warning devices on all road vehicles.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
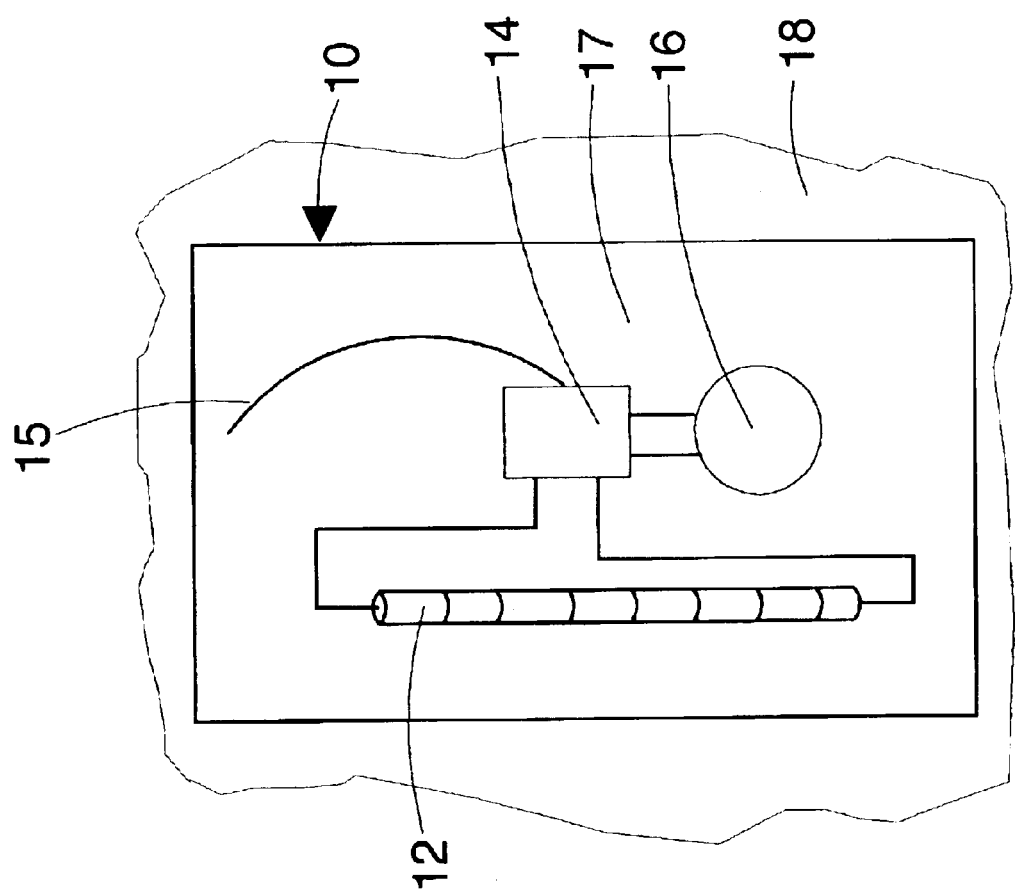
FIG. 1 is a schematic view of a single tire pressure monitor system according to the invention.

Turning now to the drawings, FIG. 1 is a schematic view of the pressure sensor portion of a tire pressure monitor system according to the invention. As seen in this FIG., the pressure sensor, generally designated with reference numeral 10, includes a stretch sensor 12, an integrated circuit 14 incorporating the pressure calculation, signal generating and r.f. transmitting circuitry, an antenna 15 and a D.C. battery power source 16. All four major sensor components are carried by a flexible base or substrate member 17 mounted on the external surface 18 of the vehicle tire side wall 19.

Stretch sensor 12 is a known component having the property of an ohmic resistance which varies in a predictable amount with linear longitudinal displacement of the sensor body. Since the body of stretch sensor 12 is secured to the outer surface 18 of tire side wall 19, the length of this body will change when the tire side wall 19 expands or contracts. The amount of the expansion or contraction of the tire side wall 19, which is a function of internal tire pressure and angular tire position, is correlated to the resistance values which are measured periodically for stretch sensor 12. Thus, by periodically measuring the value of the resistance of stretch sensor 12 over time, the internal tire pressure can be monitored over time as well. The resistance variation of stretch sensor 12 over the expected range of longitudinal displacement values in the actual use of the invention can be chosen to be essentially linear, which simplifies calibration of the pressure sensor 10. Stretch sensor 12 is preferably a Merlin Stretch Sensor available from Merlin Systems Corp. Ltd of Plymouth, England. Other equivalent variable resistance sensors may be used, as desired.

Figure 2:
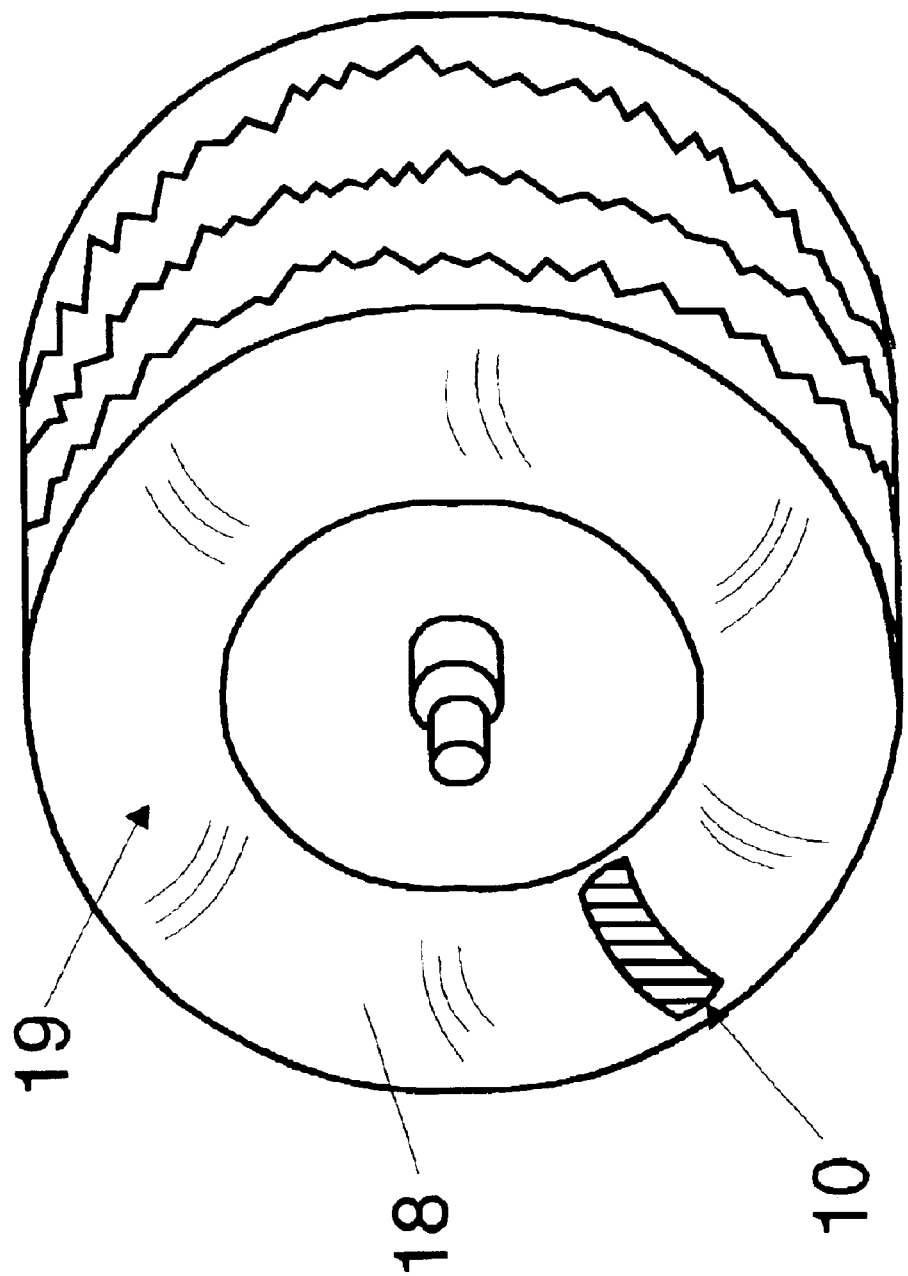
FIG. 2 is a perspective view of a vehicle tire and wheel showing the pressure monitoring system mounted thereon.
Figure 3:
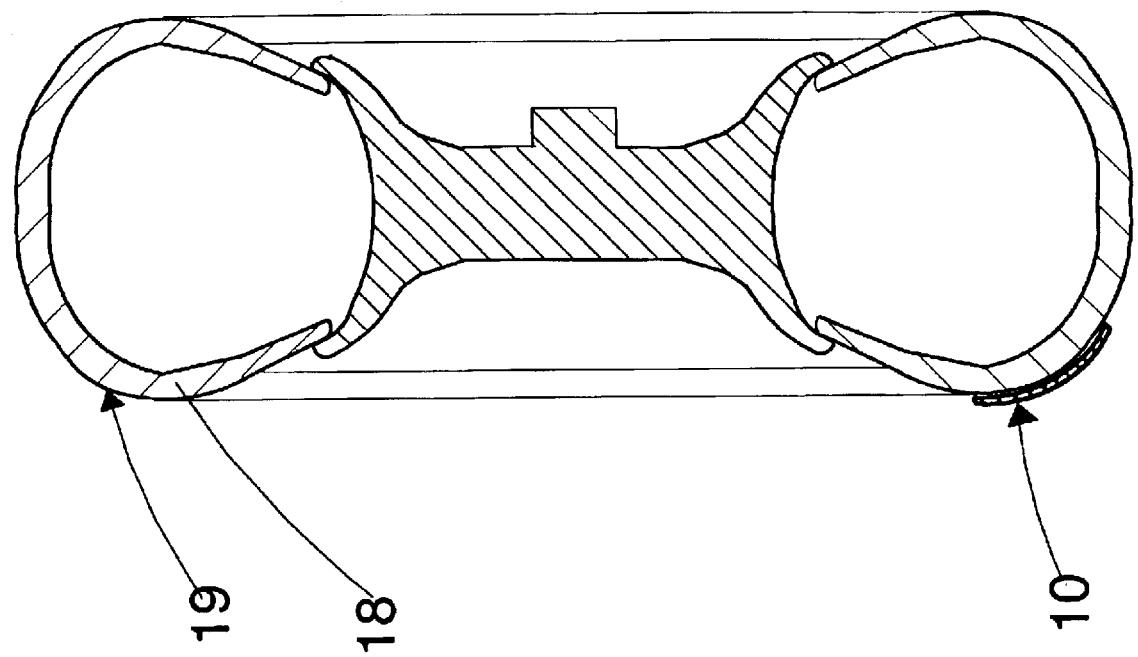
FIG. 3 is a sectional view taken along lines 3—3 of FIG. 2.

With reference to FIGS. 2 and 3, pressure sensor 10 is securely attached to tire side wall 19 in any suitable manner. For example, a strong durable epoxy or silicone-based adhesive may be applied to the confronting surfaces of pressure sensor substrate 17 and tire side wall 19 and allowed to cure under pressure. Thermal bonding may also be employed, using substrate 17 materials which are thermally compatible with the tire side wall materials for thermal bonding purposes.

Figure 4:
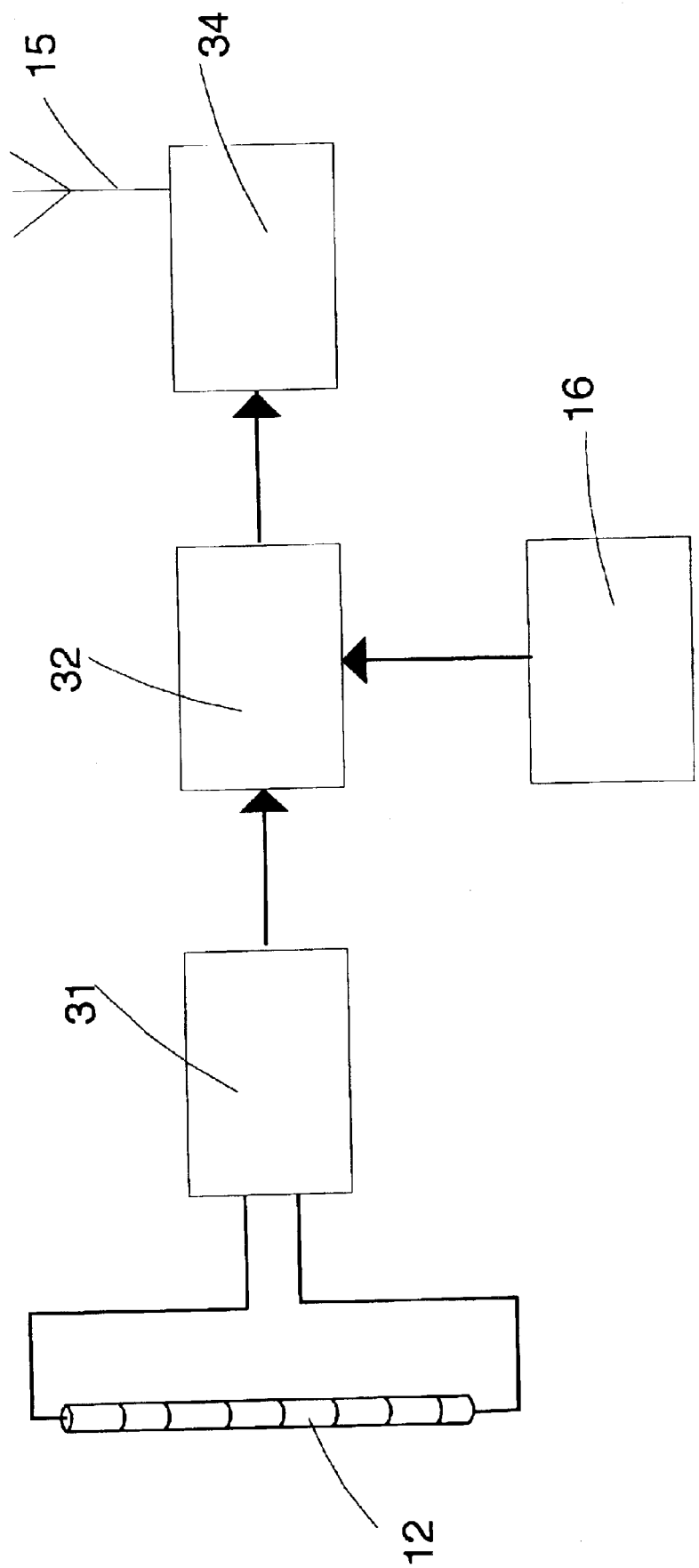
FIG. 4 is a block diagram of the tire pressure monitoring system according to the invention.

FIG. 4 is a block diagram of the invention. As seen in this FIG., stretch sensor 12 is electrically coupled to a conventional resistance bridge circuit 31. The output of bridge circuit 31 is coupled to a microcontroller 32. D.C electrical power is supplied directly to microcontroller 32 from battery 16. Microcontroller 32 controls the application of D.C. power to bridge 31 and an r.f. transmitter 34. The output of r.f transmitter 34 is coupled to antenna 15. Bridge circuit 31, microcontroller 32, and r.f. transmitter 34 are all preferably incorporated into integrated circuit 14. Alternatively, bridge circuit 31 and r.f. transmitter may be incorporated into separate enclosures, if desired. As noted above, all components of the invention are preferably mounted on a flexible substrate 17 (shown in FIG. 1) for ease of installation on tire side wall 19.

Figure 5A:
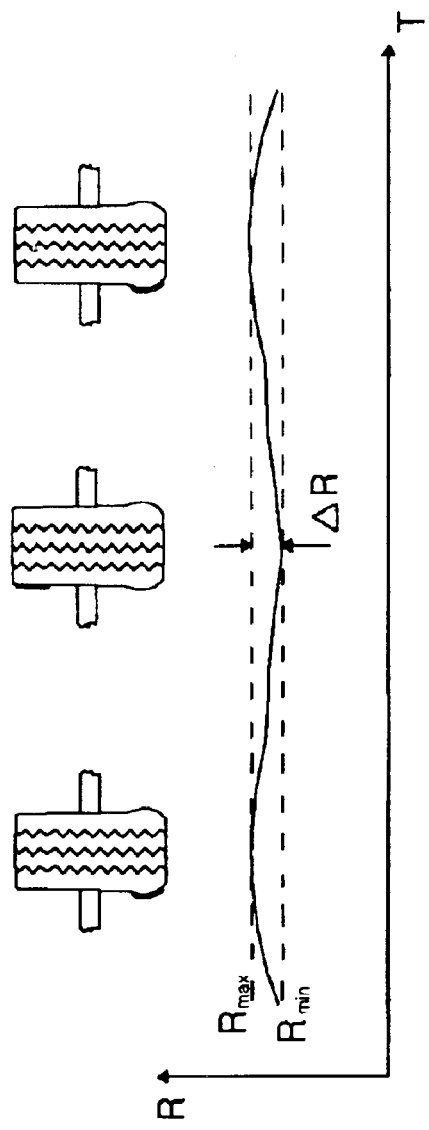
FIGS. 5A and 5B are schematic views illustrating the variation of the sensor resistance values with angular wheel position for a properly inflated tire and an under-inflated tire, respectively.
Figure 5B:
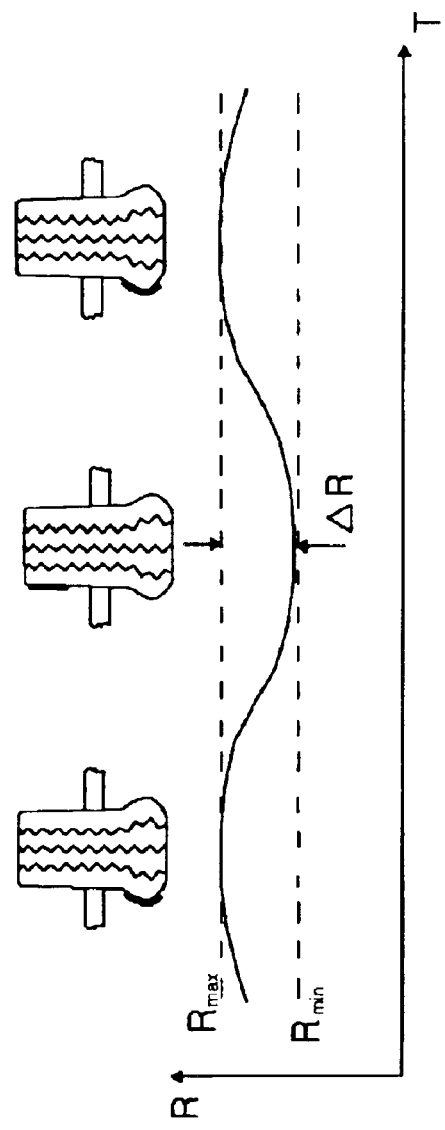

FIGS. 5A and 5B illustrate the resistance measurement process for two different tire pressure conditions: tire pressure within an acceptable range of pressures (FIG. 5A); and tire pressure below an acceptable minimum value (FIG. 5B). In the acceptable tire pressure condition illustrated in FIG. 5A, the value of the measured resistance of stretch sensor 12 varies between a maximum R max when the pressure sensor 10 is located a minimum distance from the pavement and subject to maximum displacement (adjacent the pavement), and a minimum R min when the pressure sensor 10 is at the maximum distance from the pavement and subject to minimum displacement. The parameter which is used to compute tire pressure is the difference R=(R max)–(R min). This parameter is calculated by microcontroller 32. When this value lies within a predetermined range, as is the case illustrated in FIG. 5A, no signal is transmitted from antenna 15 since the internal tire pressure is within the permitted range. When the value of R is greater than a predetermined value, microcontroller 32 activates r.f. transmitter 34, which causes a low pressure signal to be transmitted from antenna 15. This low pressure signal is received by conventional on-board receiver circuitry (not shown), which converts the low pressure signal to a perceivable warning signal, such as a visible indicator, an audible alarm, or both. In general, the receiver circuitry includes a decoder for decoding the low pressure signal to a form which can be used to operate the warning indicator. Representative examples of such receivers are illustrated and described in U.S. Pat. Nos. 5,900,808; 6,175,301; and 6,453,737. Since the receiver circuitry is conventional and well-known to those skilled in the art, further description is deemed unnecessary.

To conserve battery power, resistance measurements can be made periodically, rather than continuously. For example, an initial vale of R may first be calculated. If the value of R is less than the threshold value, microcontroller 32 will wait for one minute, and then proceed with another calculation of the parameter R. If any calculation results in a value of R which exceeds the threshold value, microcontroller 32 will wait for a shorter period (ten seconds) and then perform another calculation of the parameter R. If the result is another value of R which exceeds the threshold value, microcontroller 32 activates r.f. transmitter to generate a low tire pressure signal. If the result is a successive value of R which does not exceed the threshold value, microcontroller 32 will wait for one minute, and then proceed with the next calculation.

While the preferred embodiment has been thus-far described as a single unit for one tire, in practice each tire of a vehicle will be equipped with a tire pressure sensor system. Various encoding arrangements can be made to uniquely identify each individual sensor, and the warning indicator can be configured to identify the particular tire which is currently under-inflated.

As will now be apparent, the invention provides a simple, low cost internal tire pressure sensor system which is relatively simple to install on a vehicle tire without requiring the removal of the tire from the wheel. In addition, the tire pressure sensor according to the invention can be installed on the vehicle tire during manufacture of the tire, if desired. Further, replacement of the battery or other failed system components can be done without the need for removing the tire from the wheel, which simplifies repair or replacement of the entire system and thus lowers the cost of maintenance. Lastly, the invention provides an accurate and reliable system for monitoring tire safety on all vehicles using pneumatic tires.

While the invention has been described with reference to a particular preferred embodiment, various modifications, alternate embodiments, and equivalents may be employed, as desired. For example, while the invention has been described with reference to the use of adhesives and thermal bonding for attaching the sensor to the tire side wall, other known techniques may be used, if deemed suitable, for the purpose of attaching the sensor to the tire side wall. Therefore, the above should not be construed as limiting the invention, which is defined by the appended claims.

What is claimed is:

1. An external mount tire pressure sensor system comprising:
   a variable resistance displacement sensor element for providing resistance values indicative of internal tire pressure when coupled to an external wall surface of a pneumatic tire;
   a processor coupled to said displacement sensor element for converting resistance values corresponding to inadequate internal tire pressure to r.f. generator activation signals; and
   an r.f. generator circuit for transmitting a low tire pressure warning signal when activated by said processor.

2. The invention of claim 1 wherein said variable resistance displacement sensor element has a variable resistance characteristic which is essentially linear with longitudinal displacement.

3. The invention of claim 1 wherein said variable resistance displacement sensor, said processor, and said r.f. generator circuit are mounted on a flexible substrate.

4. The invention of claim 1 further including a D.C power source for supplying electrical power to said variable resistance displacement sensor, said processor, and said r.f. generator circuit.

5. The invention of claim 1 wherein said pressure sensor system further includes receiver circuitry for converting said low tire pressure warning signal to a warning indicator signal.

6. An external mount tire pressure sensor system comprising:
   a variable resistance displacement sensor element for providing resistance values indicative of internal tire pressure when coupled to an external wall surface of a pneumatic tire;
   a processor coupled to said displacement sensor element for converting resistance values corresponding to inadequate internal tire pressure to r.f. generator activation signals, said processor including value determining circuitry for determining the maximum and minimum resistance values provided by said variable resistance displacement sensor during one revolution of a pneumatic tire and for calculating the difference between said maximum and said minimum resistance values; and
   an r.f. generator circuit for transmitting a low tire pressure warning signal when activated by said processor.

7. The invention of claim 6 wherein said processor further includes comparison circuitry for comparing said difference with a predetermined threshold value and for activating said r.f. generator when said difference is greater than said predetermined threshold value.

8. The invention of claim 7 wherein said processor further includes control circuitry for controlling the operation of said value determining circuitry and said comparison circuitry in accordance with the magnitude of said difference.

9. The invention of claim 8 wherein said control circuitry delays the operation of said value determining circuitry and said comparison circuitry for a first time period when the magnitude of said difference does not exceed said threshold, and delays the operation of said value determining circuitry and said comparison circuitry for a second time period when the magnitude of said difference exceeds said threshold.

10. The invention of claim 9 wherein said first time period is greater than said second time period.

* * * * *